(12) United States Patent
Makabe

(10) Patent No.: US 7,679,933 B2
(45) Date of Patent: Mar. 16, 2010

(54) LOADABLE/UNLOADABLE ADAPTER FOR SUBSTRATE

(75) Inventor: Eiji Makabe, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 613 days.

(21) Appl. No.: 11/410,904

(22) Filed: Apr. 26, 2006

(65) Prior Publication Data

US 2007/0076366 A1 Apr. 5, 2007

(30) Foreign Application Priority Data

Jul. 15, 2005 (JP) ............................. 2005-207364

(51) Int. Cl.
*H05K 7/14* (2006.01)

(52) U.S. Cl. ..................... 361/801; 361/732; 361/740; 361/756; 361/759; 174/365

(58) Field of Classification Search ................ 361/801, 361/725–727, 732, 740, 741, 752, 756, 759; 174/365
See application file for complete search history.

(56) References Cited

U.S. PATENT DOCUMENTS

| | | | | |
|---|---|---|---|---|
| 4,301,494 A | * | 11/1981 | Jordan | 361/798 |
| 5,428,507 A | * | 6/1995 | Chatel et al. | 361/798 |
| 5,793,614 A | * | 8/1998 | Tollbom | 361/732 |
| 6,266,248 B1 | * | 7/2001 | Hanas et al. | 361/752 |
| 6,302,714 B1 | * | 10/2001 | Bolognia et al. | 439/157 |
| 6,395,976 B1 | * | 5/2002 | Koradia et al. | 174/359 |
| 6,567,274 B1 | * | 5/2003 | Tusan et al. | 361/740 |
| 6,816,383 B2 | * | 11/2004 | Barringer et al. | 361/759 |
| 6,935,868 B1 | * | 8/2005 | Campini et al. | 439/67 |
| 7,292,457 B2 | * | 11/2007 | DeNies et al. | 361/801 |
| 2003/0002261 A1 | * | 1/2003 | Berry et al. | 361/727 |
| 2006/0041783 A1 | * | 2/2006 | Rabinovitz | 714/6 |
| 2006/0067063 A1 | * | 3/2006 | Stahl et al. | 361/754 |

* cited by examiner

*Primary Examiner*—Jinhee J Lee
*Assistant Examiner*—Xiaoliang Chen
(74) *Attorney, Agent, or Firm*—Kratz, Quintos & Hanson, LLP

(57) ABSTRACT

A loadable/unloadable adapter for a substrate which can simplify the loading and unloading work of the substrate. A substrate 23 is loaded to an loadable/unloadable adapter 13. The loadable/unloadable adapter 13 is inserted from a window hole 14 of a housing 12. A handle member 26 swings about a supporting axis 25. A projected piece 27 moves in accordance with swinging of the handle member 26. A projected piece 27 causes the loadable/unloadable adapter 13 to move forward on the basis of the so-called principle of a lever. Even when a resistance force works for the forward movement of the loadable/unloadable adapter 13 on the basis of a friction resistance of both front connector 18 and main connector 21 when these connectors are coupled, the forward movement of the loadable/unloadable adapter 13 can be attained only with a comparatively small force.

5 Claims, 8 Drawing Sheets

LOADABLE/UNLOADABLE ADAPTER FOR SUBSTRATE

BACKGROUND OF THE INVENTION

1. Field of the Invention

The present invention relates to loading unloading of a substrate, for example, a PCI board.

2. Description of the Related Art

A so-called PCI board is well known. The PCI board is inserted into connectors mounted to a motherboard. Thereby, electrical connection between the PCI board and the motherboard is established.

An external connector is mounted to the PCI board. When the PCI board is inserted into the motherboard in the housing, the external connector faces an aperture defined to a back panel of the housing. The external connector accepts, for example, a connector of a cable such as the LAN cable.

For insertion of the PCI board, the external connector must be aligned to the aperture of the back panel. Insertion is remarkably restricted in accordance with the positional relationship between the back panel and the motherboard. For example, in the server computer, the motherboard is pulled out from the housing together with the back panel. For example, in the desk-top type personal computer, a side panel of the housing is widely opened.

SUMMARY OF THE INVENTION

The present invention has been proposed considering the background explained above and therefore it is an object of the present invention to provide a loadable/unloadable adapter for substrate which can simplify loading and unloading of the substrate.

According to a first embodiment, there is provided a loadable/unloadable adapter for a substrate, in order to achieve the objects explained above, which includes a supporting member, a first connector allocated on the supporting member and coupled with connectors of the substrate supported with the supporting member, a slider for guiding in the forward and backward directions the moving of the supporting member, a second connector allocated at the front end of the supporting member, a supporting axis allocated at the rear end of the supporting member and extending along the plane crossing the forward and backward directions in the orthogonal direction, and a projected piece supported with the supporting axis to move around the supporting axis between a rest position located at the front end side more than the supporting axis along the forward and backward direction and an operating position located later more than the supporting axis along the forward and backward directions.

Such a loadable/unloadable adapter for a substrate permits mounting of the predetermined substrate thereto. Electrical connection may be set up between the connector of substrate and the first connector. Thereafter, forward and backward moving of the substrate and the loadable/unloadable adapter is realized with operation of the slider. Based on such forward and backward moving, the second connector may be connected with the corresponding connector. In this case, the projected piece may be engaged with the desired fixing member. When moving of the projected piece is forcibly driven around the supporting axis, the forward and backward moving of the loadable/unloadable adapter can be driven forcibly on the basis of the so-called principle of a lever. Even when a resistance force is applied to the moving of the loadable/unloadable adapter on the basis of the friction resistance between the second connector and the corresponding connector when these connectors are coupled, moving of the loadable/unloadable adapter can be achieved with a comparatively small force.

According to a second embodiment, there is provided a loadable/unloadable adapter for a substrate, including a supporting member, a first connector allocated on the supporting member and coupled with connectors of substrate supported with the supporting member, a slider for guiding moving of the supporting member in the forward and backward directions, a second connector allocated at the front end of the supporting member, a supporting axis allocated at the rear end of the supporting member and extending along the plane crossing the forward and backward direction in the orthogonal direction, and a handle member supported with the supporting axis and swinging around the supporting axis between an accommodating position overlapped with the supporting member and an extending position extending backward from the supporting member.

As explained above, such a loadable/unloadable adapter for a substrate permits loading of the predetermined substrate thereto. Electrical connection is set up between the connector of the substrate and the first connector. Thereafter, forward and backward moving of the substrate and the loadable/unloadable adapter can be realized with operation of the slider. Based on such forward and backward moving, the second connector may be connected to the corresponding connector. In this case, a worker can carry the loadable/unloadable adapter by holding the handle member. The loadable/unloadable adapter can be inserted, for example, into a window hole with comparative ease. Namely, work such as removable loading of substrate can be simplified remarkably.

Such a loadable/unloadable adapter for a substrate may be provided with an ON/OFF switch allocated on the supporting member to switch supply of electrical power and suspension of supply thereof toward the substrate from the first connector and a contact piece allocated on the handle member to be in contact with the ON/OFF switch at the accommodating position of the handle member. According to this ON/OFF switch, supply of electrical power and suspension of supply can be controlled easily with the substrate to be loaded to the loadable/unloadable adapter. In this case, the contact piece may also be mounted on the handle member to freely move forward and backward for the ON/OFF switch on the handle member located at the accommodating position. For example, the ON/OFF switch can be protected from excessive depressing force in accordance with an elastic force of the contact piece even when a driving force for the forward moving is further applied to the contact piece, for example, after the operating axis of the ON/OFF switch moves forward in the largest extent. Peeling of the ON/OFF switch and reduction of operating life can be successfully eliminated. Moreover, a comparatively larger size error can be allowed for assembling of the ON/OFF switch and contact piece.

In the loadable/unloadable adapter for a substrate explained above, the supporting member may be provided with a substrate for receiving surface mounting of the ON/OFF switch, a back panel member coupled with the rear end of the substrate to receive the supporting axis to freely rotate, and an aperture bored to the back panel member. When the substrate is mounted to the loadable/unloadable adapter, the connector of substrate is providing facing the aperture. The corresponding connector is coupled with the connector of substrate through this aperture.

As explained above, according to the present invention, removable loading of the substrate can be very much simplified.

DETAILED DESCRIPTION OF AN EXEMPLARY EMBODIMENT

An exemplary embodiment of the present invention will be explained below with reference to the accompanying drawings.

Figure 1:
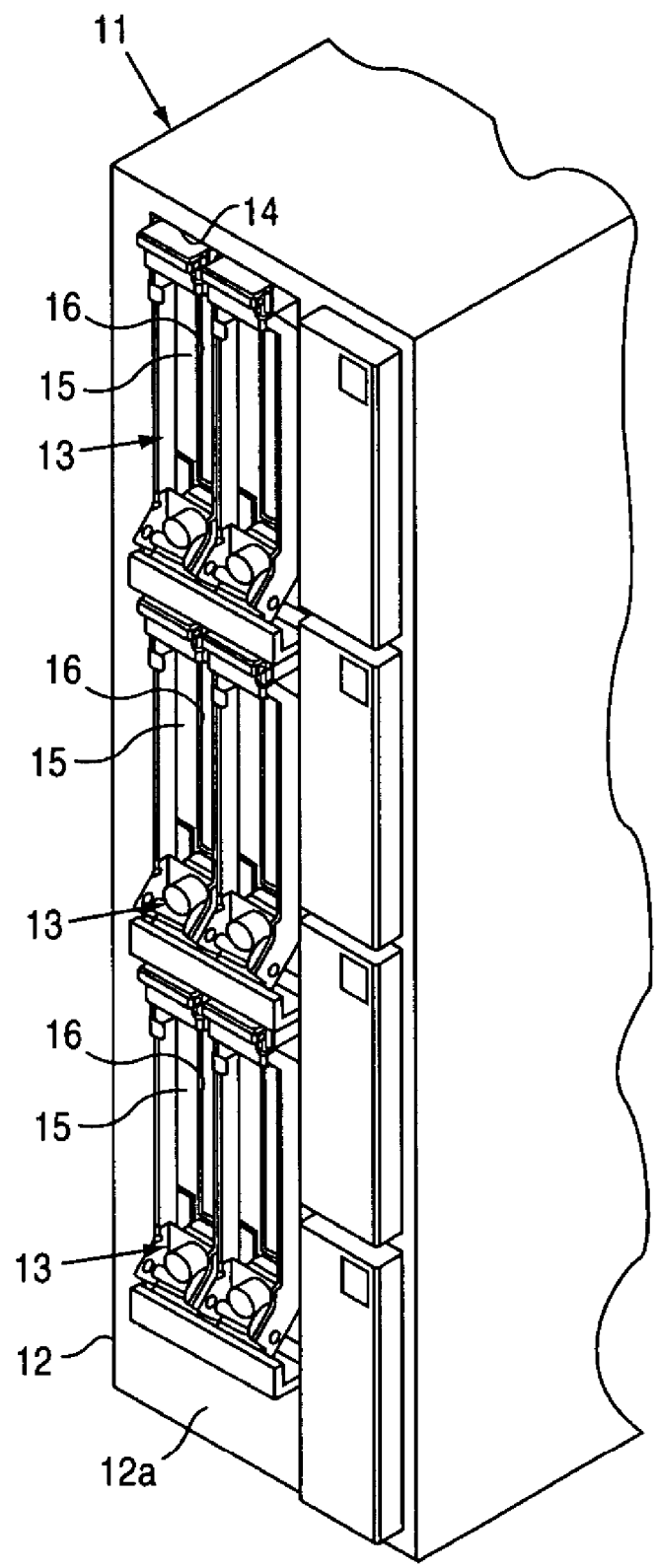
FIG. 1 shows a partial perspective view of a server computer schematically illustrating a back panel of the server computer.

FIG. 1 illustrates an example of a server computer 11. The server computer 11 is provided with a housing 12. The loadable/unloadable adapter 13 of the present invention is inserted to a back panel 12a of the housing 12. A window hole 14 for accepting the loadable/unloadable adapter 13 is formed in the back panel 12a. The window hole 14 is closed with a back panel member 15 of the loadable/unloadable adapter 13. The back panel member 15 extends, for example, in the perpendicular direction orthogonally crossing the floor surface.

An aperture 16 is defined in the back panel member 15 of the loadable/unloadable adapter 13. As will be explained later, this aperture 16 faces an external connector of the PCI board loaded to the loadable/unloadable adapter 13. A connector of a cable (not illustrated), for example, a LAN cable is inserted into the aperture 16. The connector is coupled with the external connector of the PCI board.

Figure 2:
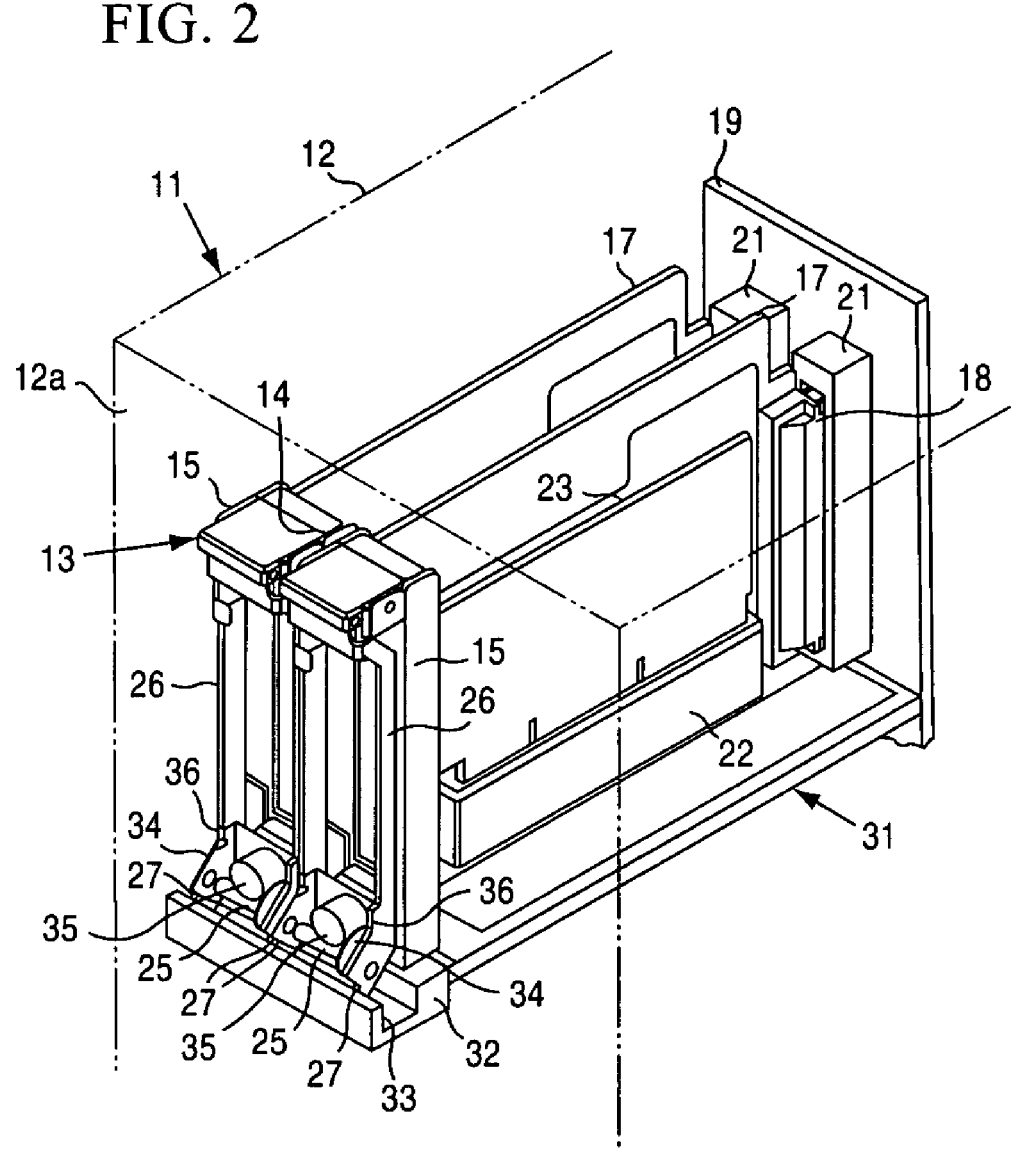
FIG. 2 shows a magnified perspective view schematically illustrating the relationship between a loadable/unloadable adapter and a frame depending on an embodiment of the present invention.

As illustrated in FIG. 2, the back panel member 15 is coupled with an erected substrate 17 which orthogonally crosses the back panel member 15. The erected substrate 17 widely spreads in the horizontal direction from the rear end coupled with the back panel member 15. Simultaneously, the erected substrate 17 also sets up the erected attitude in the gravity direction, namely, in the perpendicular direction. At the front end of the erected substrate 17, a front connector 18 is mounted. The front connector 18 is accepted by a main connector 21 mounted on a motherboard 19. Individual terminals within the front connector 18 are individually in contact with each terminal in the main connector 21. Electrical connection between the erected substrate 17 and the motherboard 19 are established as explained above. Here, the erected substrate 17 and back panel member 15 form a supporting member of the present invention through cooperation thereof.

At the lower end of the erected substrate 17, a card edge connector 22 is mounted. The card edge connector 22 extends in the horizontal direction along the front surface of the erected substrate 17. As will be explained later, the card edge connector 22 is capable of accepting an edge of the PCI board in the gravity direction. At the edge of the PCI board 23, conductive terminals are formed with the predetermined interval. Individual conductive terminals are individually in contact with each terminal in the card edge connector 22. Thereby, electrical connection is established between the PCI board 23 and the erected substrate 17. To the erected substrate 17, a wiring pattern is formed. The wiring pattern connects the individual terminals in the front connector 18 to individual terminals in the card edge connector 22. Accordingly, electrical connection is established between the PCI board 23 and the motherboard 19.

A supporting axis 25 is fixed to the back panel member 15. This supporting axis 25 extends in the horizontal direction along the plane orthogonally crossing the forward and backward directions of the erected substrate 17. A handle member 26 is attached to freely rotate about the supporting axis 25. The handle member 26 is connected to a projected piece 27 which is extending almost in the opposite direction. It is enough when the projected piece 27 is integrated to the handle member 26. When the handle member 26 rotates about the supporting axis 25, the projected piece 27 is caused to move about the supporting axis 25.

As will be apparent from FIG. 2, a frame 31 is fixed to a housing 12. A receiving member 32, which is projected to the external side of a window hole 14, is integrated to the frame 31. A groove 33 extending in the horizontal direction parallel to the supporting axis 25 in the external side of the window hole 14 is defined in the receiving member 32. When the handle member 26 is positioned to the accommodating position overlapped on the back panel member 15, the projected piece 27 is positioned to the operating position located backward of the supporting axis 25 along the forward and backward direction. The projected piece 27 is butted to the receiving member 32 within the groove 33 thereof. Accordingly, the projected piece 27 is engaged with the receiving member 32 as long as it is maintained at the operating position. Therefore, the loadable/unloadable adapter 13 is protected from unloading.

A stopper member 34 is supported to freely rotate about the supporting axis 25. A screw member 35 is assembled into the stopper member 34. This screw member 35 can be threaded into the back panel member 15. When the screw member 35 is threaded into the back panel member 15, rotation of the stopper member 34 about the supporting axis 25 is impeded.

To the stopper member 34, an engaging piece 36 is formed for engagement from the backward direction with the handle member 26 located at the accommodating position. Accordingly, when the screw member 35 is threaded into the back panel member 15, the stopper member 34 impedes rotation of the handle member 26 about the supporting axis 25. Thereby, the handle member 26 is maintained at the accommodating position.

Figure 3:
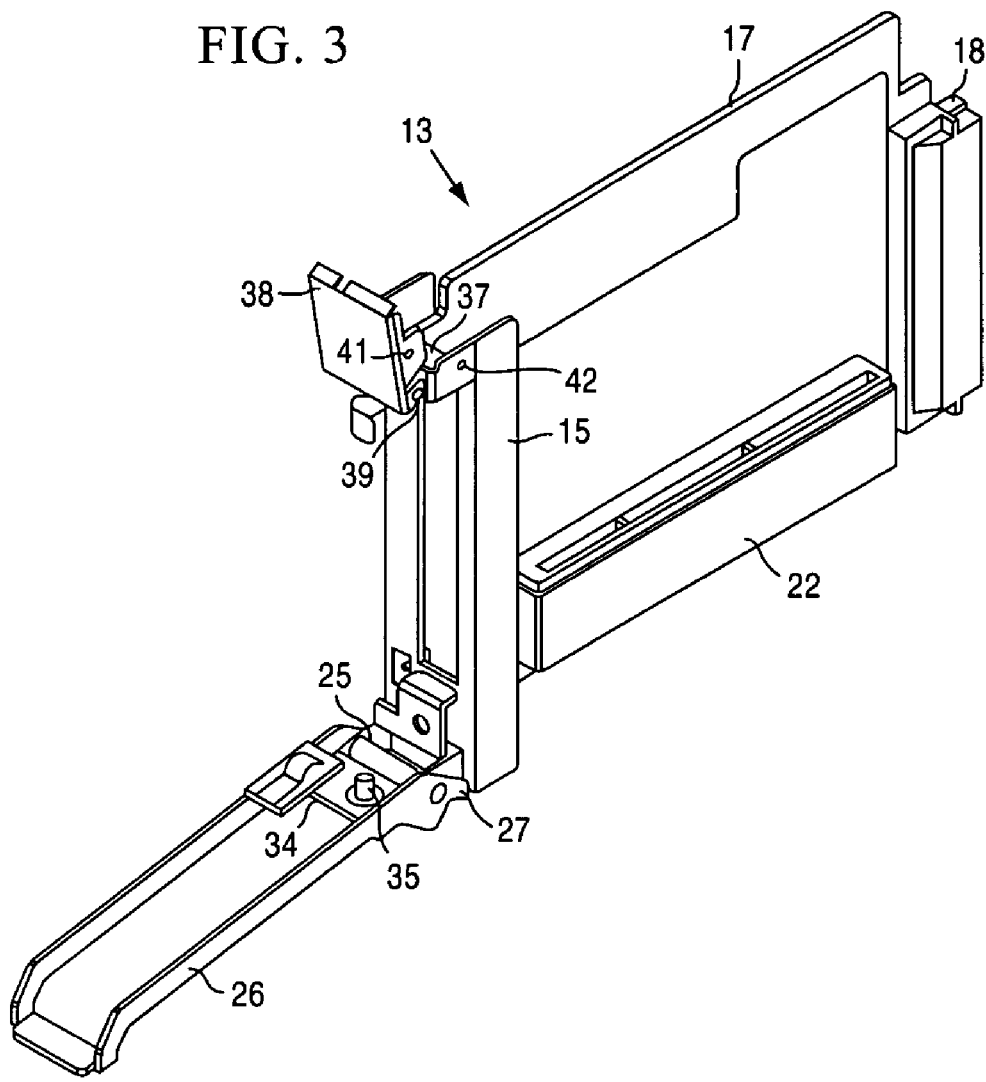
FIG. 3 shows a magnified perspective view schematically illustrating a structure of the loadable/unloadable adapter.

As illustrated in FIG. 3, the handle member 26 is positioned to the position extended backward from the back panel member 15 through swinging around the supporting axis 25. Accordingly, the horizontal attitude of the handling member 26 is established. In this case, the projected piece 27 is positioned at a rest position 9 located in the forward end side of the supporting axis 25 along the forward and backward direction of the erected substrate 17. In this rest position, the projected piece 27 can be isolated, as will be explained later, from the groove 33 of the receiving member 32. The projected piece 27 is butted to the back panel member 15. The projected piece 27 restricts rotation of the handle member 28 for the back panel member 15.

A horizontal plate 37 rising backward from the rear surface of the back panel member 15 is defined to the back panel member 15. On the other hand, as will be explained later, a panel member rising from the front surface of the substrate at one end of the substrate is assembled into the PCI board 23. The horizontal plate 37 accepts the panel member of the PCI board entering in the gravity direction.

The horizontal plate 37 is provided with a clamping member 38 facing thereto. This clamping plate 38 can swing about a pivot 39 extended in parallel to the supporting axis 25. As will be explained later, when the PCI board 23 is perfectly accepted with the card edge connector 22, the panel member of the PCI board 23 is held between the clamping member 38 and the horizontal plate 37. Unloading of the PCI board 23 can be restricted. Here, a semi-spherical projection 41 projected in parallel to the pivot 39 is formed in the clamping member 38. This projection 41 is accepted with an accepting hole 42 formed to the back panel member 15. For such acceptance, the clamping member 38 is provided with a certain elasticity restoring force. When the projection 41 is accepted with the accepting hole 42, rotation of the clamping member 38 about the pivot 39 is restricted.

Figure 4:
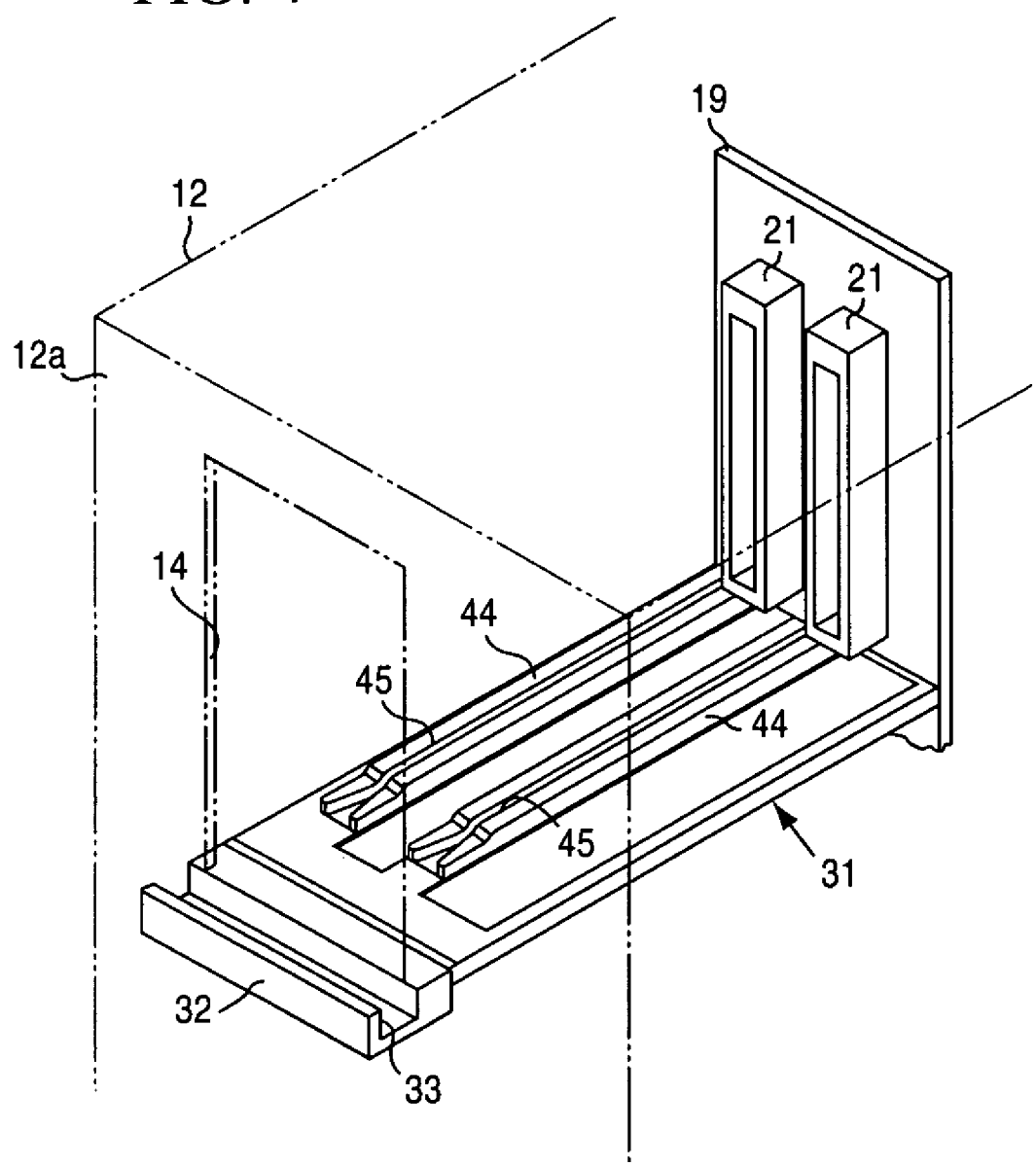
FIG. 4 shows a magnified perspective view schematically illustrating a structure of the frame.

As is illustrated in FIG. 4, a guide rail 44 extending up to the motherboard 19 toward the front side from the accepting member 32 is defined to the frame 31. This guide rail 44 is also provided with a guiding groove 45 extending linearly toward the bother board 19 from the window hole 14. This guide rail 45 accepts an edge of the erected substrate 27. The guide groove 45 guides moving of the erected substrate 17 along the forward and backward directions. As will be explained later, unloading of the loading/unloading adapter 13 can be realized on the basis of the guidance of the guide rail 44.

Figure 5:
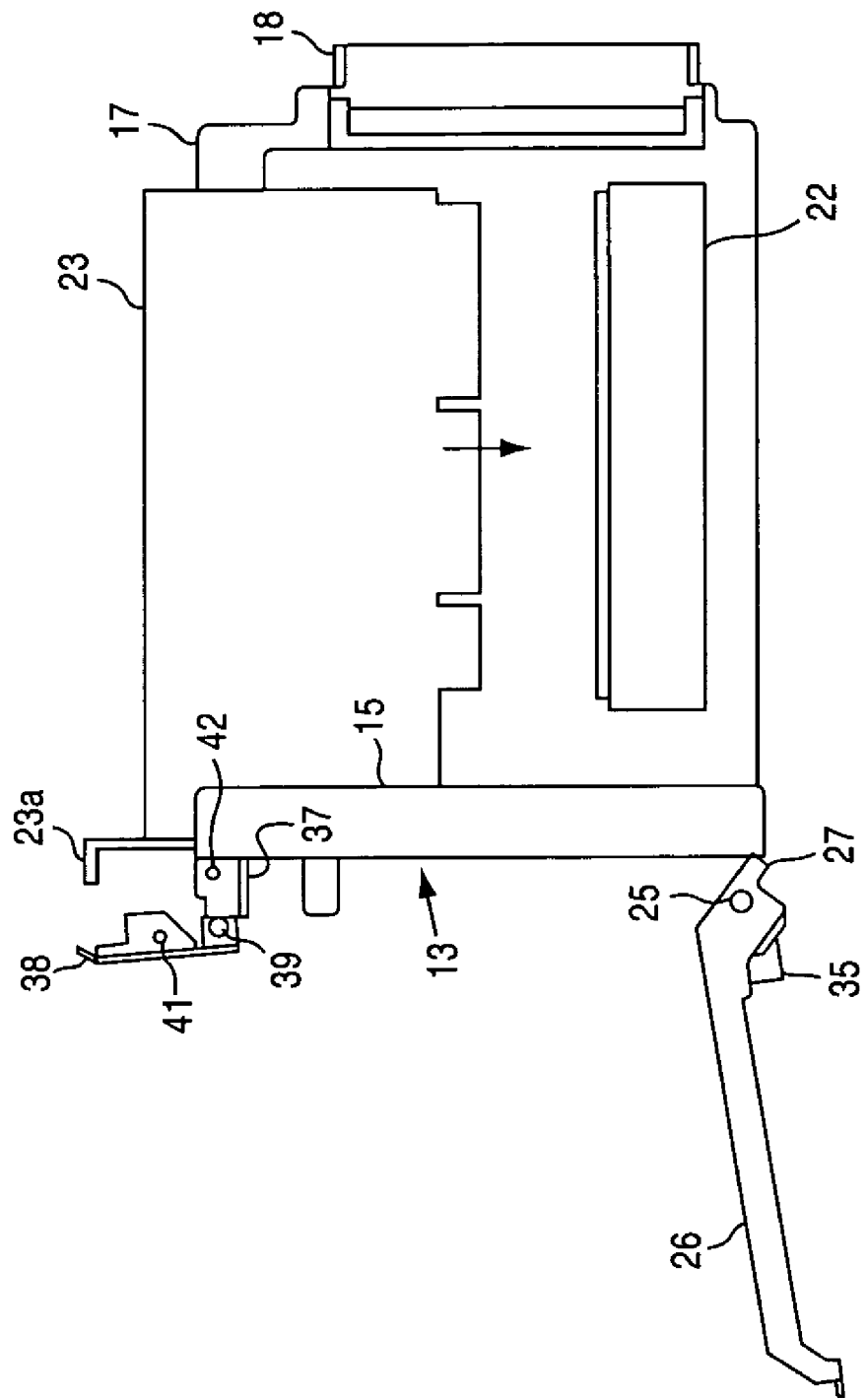
FIG. 5 shows a side elevation view of the loadable/unloadable adapter schematically illustrating a profile of a PCI board to be mounted to the loadable/unloadable adapter.

Mounting of the PCI board 23 to the motherboard 19 explained above is assumed here. For this loading, the loadable/unloadable adapter 13 may be used. First, as will be illustrated in FIG. 5, the PCI board 23 is loaded to the loadable/unloadable adapter 13. In this case, it is enough when the erected substrate 17 is maintained in the erected attitude. Simultaneously, it is also enough when the PCI board 23 is maintained in the erected attitude. In the PCI board 23, the conductive terminals are arranged along the edge at the lower end of the PCI board. A worker is capable of moving the PCI board 23 in the vertical direction along the front surface of the erected substrate 17. For such vertical moving, the panel member of the PCI board 23 is guided with the back panel member 15 of the loadable/unloadable adapter 13. Thereby, the edge at the lower end of the PCI board 23 is accepted with the card edge connector 22. Prior to the loading of the PCI board 23, the handle member 26 is positioned at the extending position around the supporting axis 25. In the same manner, the clamping member 38 is positioned far from the horizontal plate 37 of the back panel member 15 around the pivot 39. Namely, the clamping member 38 moves backward from the moving route of the panel member 23a. As a result, the panel member 23a of the PCI board 23 can reach the horizontal plate 37 without contact with the clamping member 38.

Figure 6:
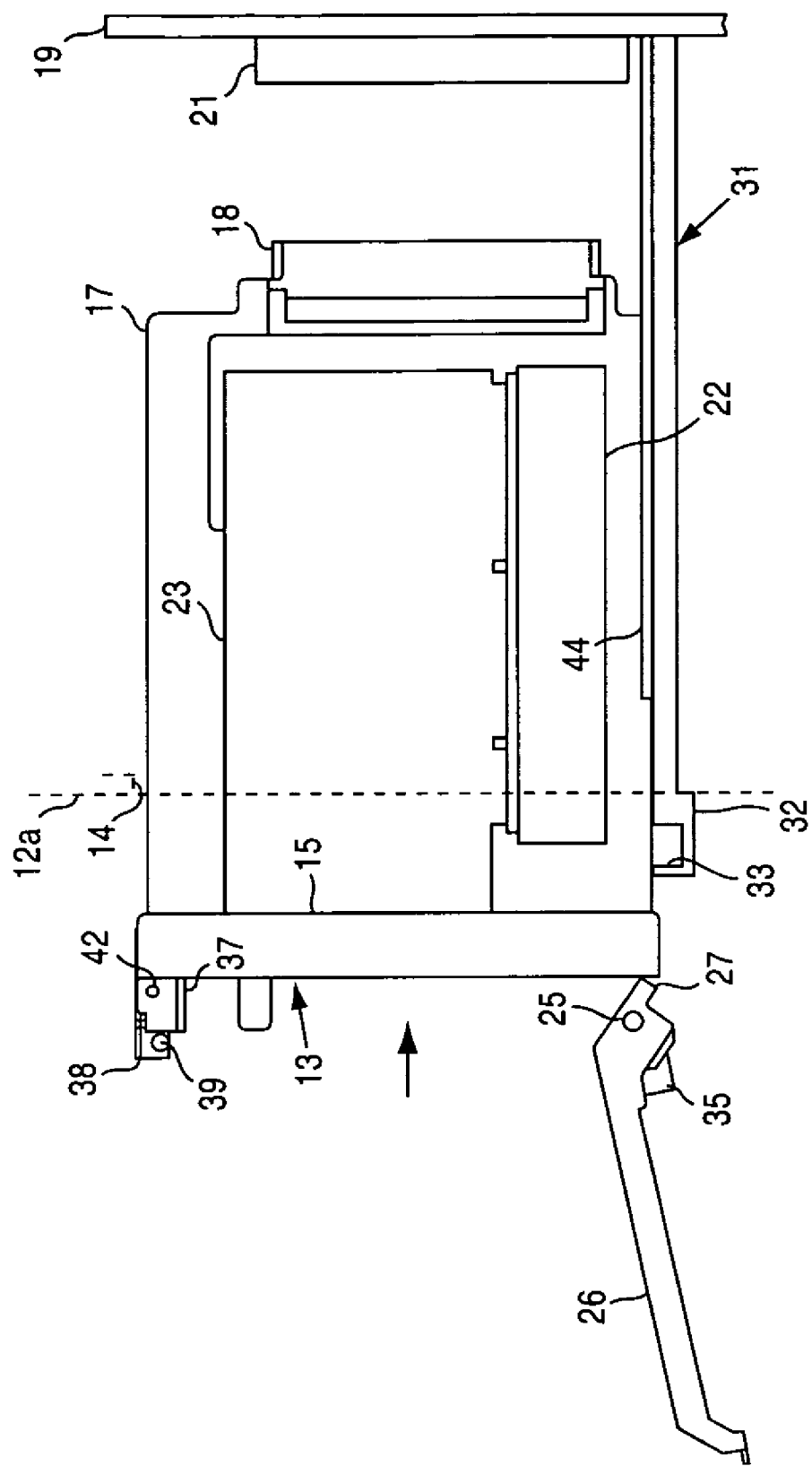
FIG. 6 shows a side elevation view of the loadable/unloadable adapter and the frame schematically illustrating a profile the loadable/unloadable adapter inserted to a window hole of a back panel.

When the panel member 23a of the PCI board 23 is accepted with the horizontal plate 37, a worker is capable of rotating the clamping member 38 toward the horizontal plate 37 about the pivot 39 as apparent, for example, from FIG. 6. The clamping member 38 clamps the panel member 23a to the horizontal plate 37. Play of the panel member 23a is impeded. The projection 41 is accepted with the accepting hole 42. Unloading of the panel member 23a can be prevented.

As is illustrated in FIG. 6, the loadable/unloadable adapter 13 is inserted into the window hole 14 from the front end. The edge at the lower end of the erected substrate 17 is accepted with the guide groove 45 of the guide rail 44. When the erected substrate 17 moves forward along the guide rail 44, the front connector 18 on the erected substrate 17 is closer to the main connector 21 on the motherboard 19. In this case, a worker is capable of holding the handle member 26 at the extending position. Because the projection 27 is butted here to the back panel member 15, the erected substrate 17 can be maintained in the horizontal attitude without any particular support based on the holding by the handle member 26. A worker is capable of rather easily inserting the loadable/unloadable adapter 13 to the window hole 14.

Figure 7:
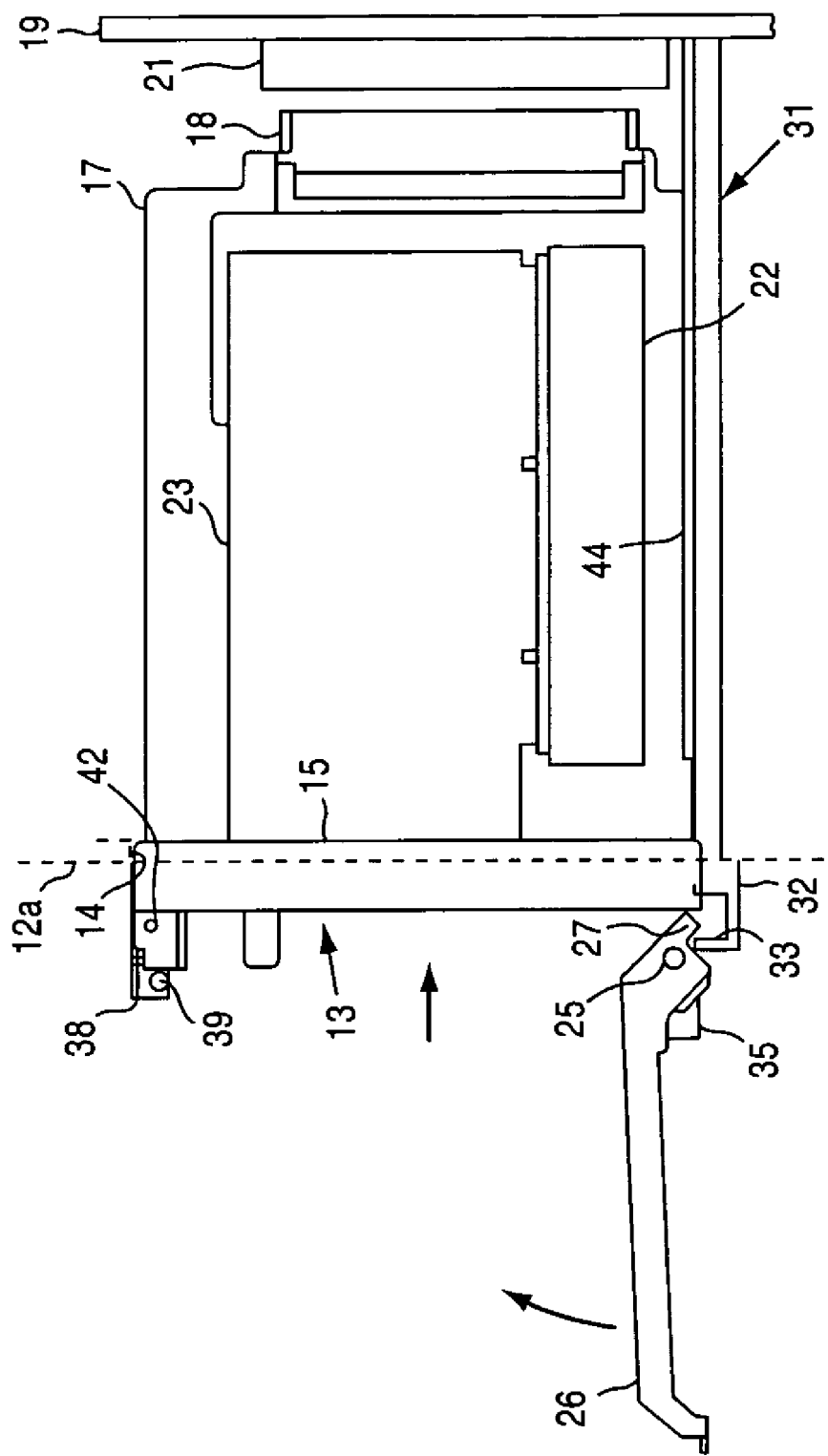
FIG. 7 shows a side elevation view of the loadable/unloadable adapter schematically illustrating the relationship between a projected piece and an accepting member.

Thereafter, as is illustrated in FIG. 7, the handle member 26 is in contact with the accepting member 32. Forward moving of the loadable/unloadable adapter 13 is restricted. Subsequently, a worker is capable of swinging the handle member 26 toward the back panel member 15 around the supporting axis 25. Such swinging of the handle member 26 generates movement of the projection 27 about the supporting axis 25. The projection 27 moves backward for the supporting axis 25 about the supporting axis 25 in accordance with swinging of the handle member 26 while it is going into the groove 33 of the accepting member 32. On the basis of so-called the principle of a lever, the projection causes the loadable/unloadable adapter 13 to mode forward. Even when a resistance force is generated for the forward moving of the loadable/unloadable adapter 13 on the basis of a friction resistance between the front connector 18 and main connector 21 when these connectors are coupled, forward moving of the loadable/unloadable adapter 13 can be attained with a comparatively small force.

Figure 8:
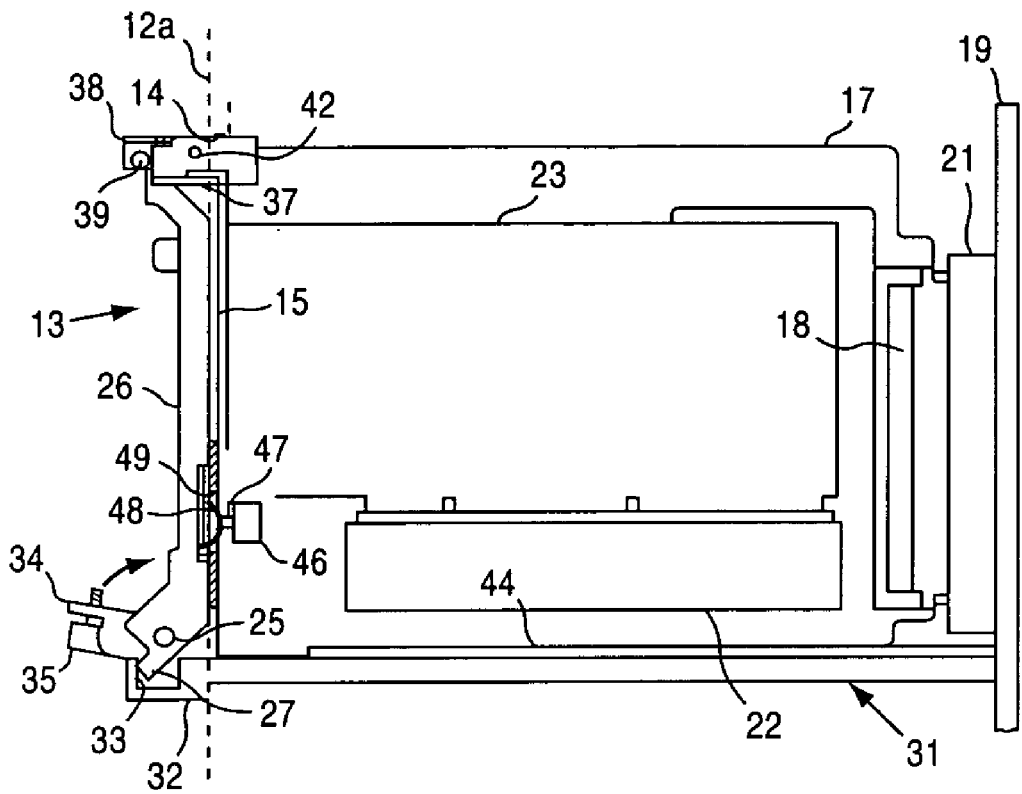
FIG. 8 shows a side elevation diagram of the loadable/unloadable adapter and the frame schematically illustrating a profile of the loadable/unloadable adapter which is perfectly loaded.

As is illustrated in FIG. 8, when the handle member 26 reaches the accommodating position, the loadable/unloadable adapter 13 enters perfectly the window hole 14. Coupling between the front connector 18 and main connector 21 is established. Thereafter, a worker is capable of rotating the stopper member 32 about the supporting axis 25. When the screw member 35 is threaded into the back panel member 15, the handle member 26 can be held at the accommodating position.

According to use of the loadable/unloadable adapter 13, the PCI board 23 can be easily coupled with the motherboard 19 from the window hole 14 of the back panel 12a. It is not required that the motherboard 19 is unloaded together with the back panel 12a. It is also not required that the side panel of the housing 12 is widely released. Accordingly, loading and unloading works of the PCI board 23 can be distinctively simplified.

In the loadable/unloadable adapter 13 explained above, the on-switch 46 may be mounted on the erected substrate 17, for example, as illustrated in FIG. 8. For the mounting, so-called surface mounting (SMD structure) is preferably used. In this on-switch 46, a manipulation axis 47 is assembled to freely move in the forward and backward direction of the erected substrate 17. The manipulation axis 47 is projected in the backward direction. The manipulation axis 47 maintains shielding of conductivity within the predetermined range in the forward direction from the furthest backward position nearest to the pack panel member 15. When the manipulation axis 47 moves forward exceeding the predetermined range from the furthest backward position, the on-switch 46 becomes conductive. Electrical power is supplied to the PCI board 23 in accordance with the conductive condition of the on-switch 46. When shielding condition is established with the on-switch 46, supply of electrical power to the PCI board 23 is suspended. Electrical power is supplied to the loadable/unloadable adapter 13 from the motherboard 19, for example, through the main connector 21 and front connector 18.

A contact piece 48 is also attached to the handle member 26. This contact piece 48 is placed in contact with the manipulation axis 47 of the on-switch 46 at the accommodating position of the handle member 26. In accordance with such contact of the contact piece 48, the manipulation axis 47 of the on-switch 46 moves forward exceeds the predetermined range. Conductivity of the on-switch 46 is established. In this case, the contact piece 48 is constituted, for example, with an elastic material such as a plate spring. Accordingly, the contact piece 48 can move forward and backward for the on-switch 46 on the handle member 26 located at the accommodating position. In other words, even when the handle member 26 moves forward after the manipulation axis 47 moves forward in the maximum amount, the on-switch 46 can be protected from excessive clamping force in accordance with an elastic force of the contact piece 48. Thereby, peeling of the on-switch 46 and reduction in the operation life thereof can be successfully avoided. Moreover, a comparatively large size error may be allowed in the assembling of the on-switch 46 and contact piece 48. As is apparent from FIG. 8, a small aperture 49 is formed to the back panel member 15. For the contact with a manipulation piece 47, it is enough when the contact piece 48 enters the small aperture 49.

Figure 9:
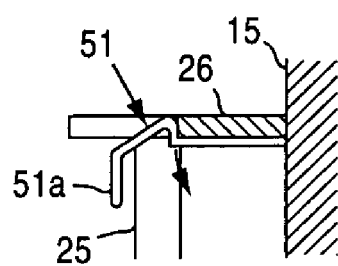
FIG. 9 shows a partial cross-sectional view of a handle member schematically illustrating the relationship with a holding tool.

As illustrated in FIG. 9, for example, the handle member 26 may be associated with a holding tool 51 for holding the accommodating position thereof. This holding tool 51 is fixed to the back panel member 15. The holding tool 51 is provided with a hook member 51a which is engaged from the backward direction with the handle member 26. The hook member 51a can be displaced in parallel to the supporting axis 25. When the handle member 26 swings toward the accommodating position around the supporting axis 25, the hook member 51a displaces on the basis of contact with the handle member 26. Therefore, the hook member 51a is hooked with the handle member 26. Swinging of the handle member 26 is restricted toward the extending position from the accommodating position. For example, when a worker forcibly displaces the hook member 51a, balance between the hook member 51a and the handle member 26 can be canceled. Thereby, the handle member 26 can swing toward the extending position from the accommodating position around the supporting axis 25.

The loadable/unloadable adapter 13 may be coupled with a substrate other than the motherboard 19 and may be loaded to a connected substrate other than the PCI board 23.

What is claimed is:

1. A loadable/unloadable adapter engageable with a window hole in a housing, the window hole comprising an edge, the adapter comprising:
   a removable and insertable circuit board, including a horizontally-extending circuit-board panel member and circuit-board connectors;
   a supporting member to support the circuit board, the supporting member including an erected substrate and a back panel member coupled with the erected substrate;
   a first connector disposed on the substrate to couple with the circuit-board connectors of the circuit board;
   a slider for guiding the adapter in forward and backward directions of insertion and removal of the supporting member into and out of the window hole;
   a second connector disposed forward of the supporting member to couple to the electronics inside the housing upon insertion of the adapter into the window hole;
   a handle member supported pivotally by a supporting axis disposed backward of the supporting member and extending along a line crossing the forward and backward directions in an orthogonal direction;
   a clamping plate, supported pivotally on a horizontal plate extending backward from a rear surface of the back panel member and rotating about a pivot extending parallel to the supporting axis, the clamping plate clamping the circuit-board panel member to the horizontal plate; and
   a projected piece disposed on the handle member to rotate about the supporting axis between
   a rest position of the handle member forward of the supporting axis along the forward and backward directions and
   an operating position of the handle member backward of the supporting axis along the forward and backward directions;
   wherein the projected piece engages the edge of the housing at the window hole when the projected piece is positioned at the operating position of the handle member and restricts rotation of the handle member.

2. A loadable/unloadable adapter engageable with a window hole in a housing, the window hole comprising an edge, the adapter comprising:
   a removable and insertable circuit board, including a horizontally-extending circuit-board panel member and circuit-board connectors;
   a supporting member to support the circuit board, the supporting member including an erected substrate and a back panel member coupled with the erected substrate;
   a first connector disposed on the substrate to couple with the circuit-board connectors of the circuit board;
   a slider for guiding the adapter in forward and backward directions of insertion and removal of the supporting member into and out of the window hole;
   a second connector disposed forward of the supporting member to couple to the electronics inside the housing upon insertion of the adapter into the window hole;
   a supporting axis disposed backward of the supporting member and extending along a line crossing the forward and backward directions in an orthogonal direction;
   a handle member supported pivotally by the supporting axis to swing about the supporting axis between an accommodating position closed with the supporting member and an extending position extending backward from the supporting member; and
   a clamping plate, supported pivotally on a horizontal plate extending backward from a rear surface of the back panel member and rotating about a pivot extending parallel to the supporting axis, the clamping plate clamping the circuit-board panel member to the horizontal plate.

3. The loadable/unloadable adapter according to claim 2, further comprising an on/off switch disposed on said supporting member to switch supply of electrical power and suspension of supply thereof toward the circuit board from the first connector and a contact piece disposed on said handle member to be in contact with the on/off switch at the accommodating position of the handle member.

4. The loadable/unloadable adapter according to claim 3, wherein said contact piece is mounted on the handle member to freely move in the forward and backward directions for the on/off switch on the handle member located on the accommodating position.

5. The loadable/unloadable adapter according to claim 3, wherein said supporting member includes a receiving surface mounting said on/off switch, and an aperture bored to said back panel member, and wherein the back panel member is coupled with the rear end of said substrate to receive said supporting axis to freely rotate.

* * * * *